US006041220A

United States Patent [19]

Suguro

[11] Patent Number: 6,041,220

[45] Date of Patent: Mar. 21, 2000

[54] PORTABLE RADIO COMMUNICATION APPARATUS

[75] Inventor: Akihiro Suguro, Yokohama, Japan

[73] Assignee: Kyocera Corporation, Kyoto, Japan

[21] Appl. No.: 08/924,202

[22] Filed: Jul. 24, 1997

[30] Foreign Application Priority Data

Jul. 25, 1996 [JP] Japan .................................... 8-196035

[51] Int. Cl.[7] ........................................................ H04B 1/38

[52] U.S. Cl. ............................ 455/90; 455/100; 343/718; 379/433

[58] Field of Search ............................ 455/90, 575, 100; 343/702, 718, 732; 361/818; 379/433

[56] References Cited

U.S. PATENT DOCUMENTS

| | | | |
|---|---|---|---|
| 4,163,236 | 7/1979 | Kaloi | 343/700 MS |
| 5,150,282 | 9/1992 | Tomura et al. | 361/818 |
| 5,235,492 | 8/1993 | Humbert et al. | 361/818 |
| 5,367,309 | 11/1994 | Tashjian | 343/702 |
| 5,515,057 | 5/1996 | Lennen et al. | 342/357 |
| 5,530,919 | 6/1996 | Tsuru | 455/90 |
| 5,603,103 | 2/1997 | Halttunen et al. | 455/90 |
| 5,657,386 | 8/1997 | Schwanke | 379/433 |
| 5,666,125 | 9/1997 | Luxon et al. | 343/702 |
| 5,787,340 | 7/1998 | Sepponen | 455/90 |

*Primary Examiner*—Wellington Chin
*Assistant Examiner*—Isaak R. Jama
*Attorney, Agent, or Firm*—Loeb & Loeb, LLP

[57] ABSTRACT

An antenna device having a surface on which radiation of an output of the antenna device is suppressed in at least one direction is attached to a case so that the radiation-output-suppressed surface of the antenna device is arranged to face an user side at the time of talking.

5 Claims, 6 Drawing Sheets

PORTABLE RADIO COMMUNICATION APPARATUS

BACKGROUND OF THE INVENTION

The present invention relates to a technique for suppressing energy radiated from an antenna device, and particularly relates to a technique for preventing electromagnetic wave from giving a user a risk of injuring the operator's health when such an antenna device is mounted on a portable radio communication apparatus such as a satellite portable telephone, etc.

In recent years, ideas of satellite portable telephones using satellites revolving around the earth in a low or intermediate orbit have been proposed from various companies. With respect to frequency bands therefor, there are two satellite communication protocols. In one protocol, a 1.6 GHz band is allocated to communication from a ground satellite portable telephone to a satellite and a 2.4 GHz band is allocated to communication from the satellite to the ground satellite portable telephone. In the other protocol, a 1.6 GHz band is allocated to two-way communication from the ground to the satellite and from the satellite to the ground. Most of satellite communication systems use circularly polarized wave.

In recent years, there are opinions which point out a risk of electromagnetic wave injuring health of users of portable telephones. Although the causal relationship between electromagnetic wave and health injury is unknown at present, a technique for preventing electromagnetic wave from giving users a risk of injuring their heath should be established for accomplishment of satellite communication in a portable telephone transmitting electromagnetic wave toward the satellite.

SUMMARY OF THE INVENTION

An object of the present invention is to provide a portable radio communication apparatus in which electromagnetic wave is prevented from giving a user a risk of injuring the user's health.

In order to solve the above object, according to a first aspect of the present invention, provided is a portable radio communication apparatus comprising a case and an antenna device having a surface on which radiation of an output of the antenna device is suppressed in at least one direction, wherein the antenna is attached to the case so that the radiation-output-suppressed surface of the antenna device is arranged to face an user side at the time of talking.

According to the present invention, the portable radio communication apparatus is a satellite portable telephone which is a radio communication apparatus comprising case and an antenna device having a flat antenna directed to a vertical direction, and a plurality of linear radiating elements connected to a grounding conductor of the flat antenna and arranged downward, wherein at least one of design factors such as the number, width, length, mount position, etc., of the linear radiating elements is changed so that radiation of an output of the antenna device on a surface thereof is suppressed in at least one of horizontal directions, and wherein the antenna device is attached to the case so that the radiation-output-suppressed surface is arranged to face a user side at the time of talking. The flat antenna has a circularly polarized mode mainly in a vertical direction. The plurality of radiating elements contribute to radiation mainly in horizontal directions. Furthermore, the downward radiation output of the antenna device is suppressed so that the suppression is useful for reduction of electric power consumed by the portable radio communication apparatus.

BRIEF DESCRIPTION OF THE PREFERRED EMBODIMENTS

Figure 6A:
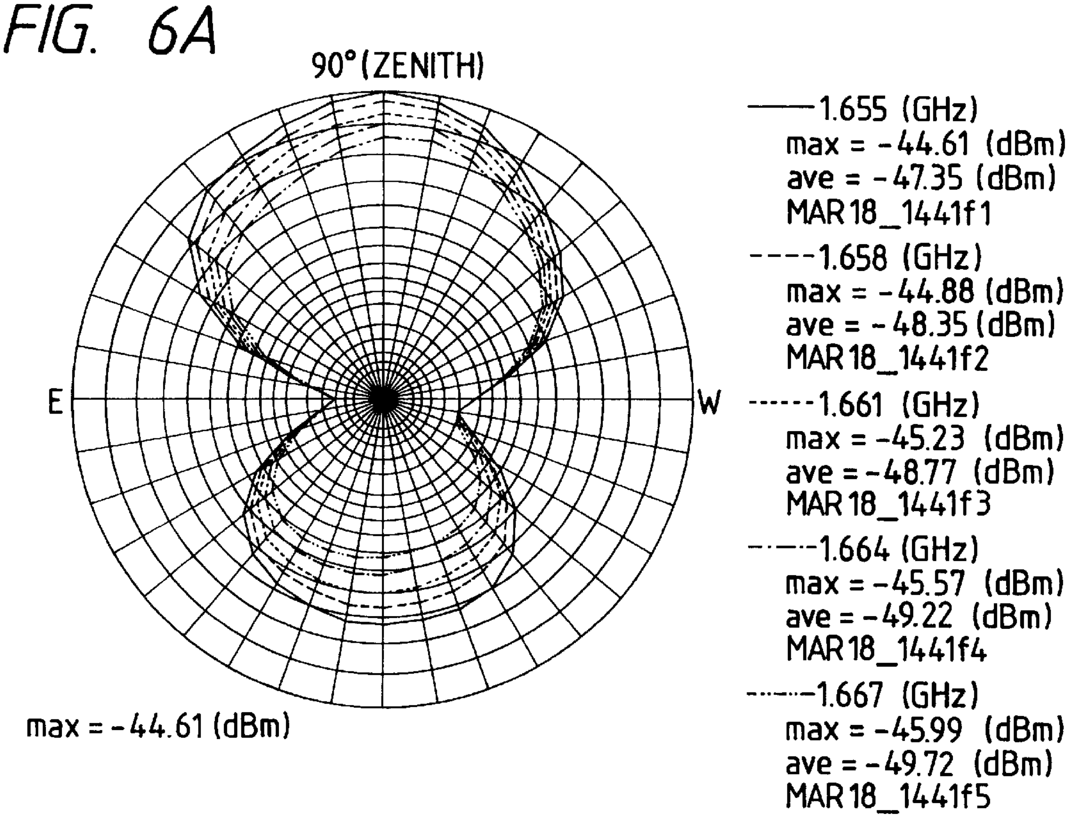
Figure 6B:
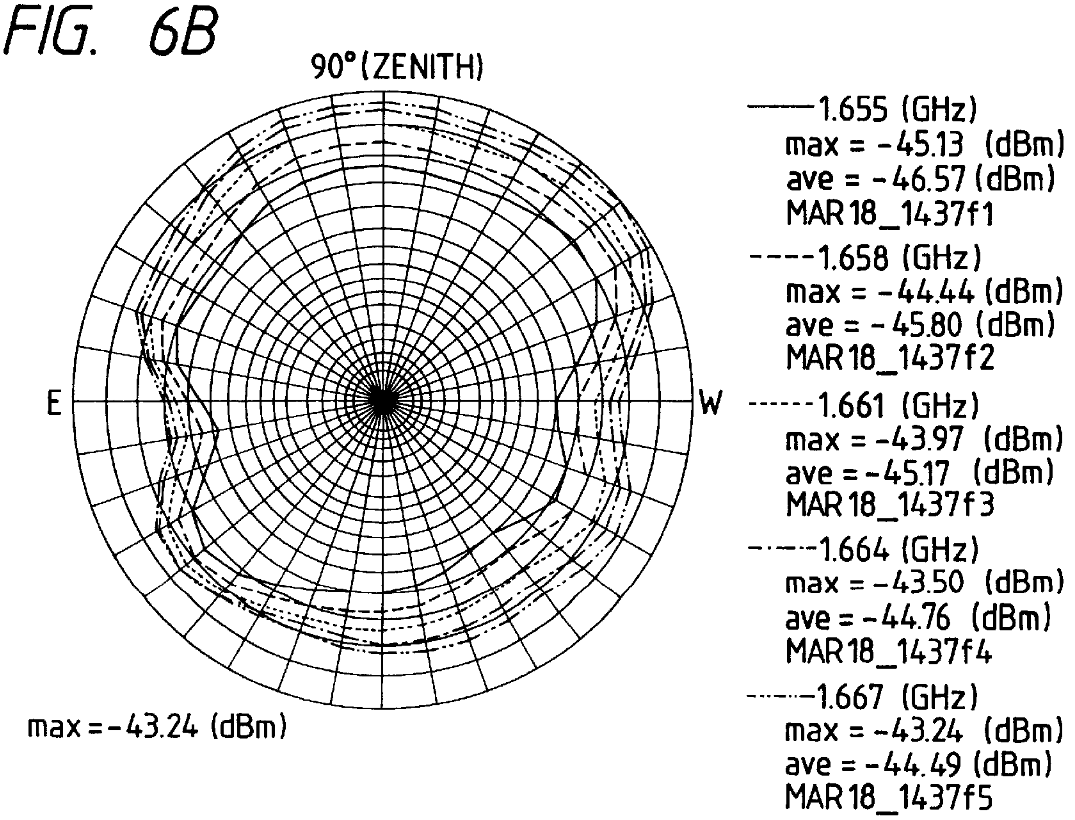
Figure 7A:
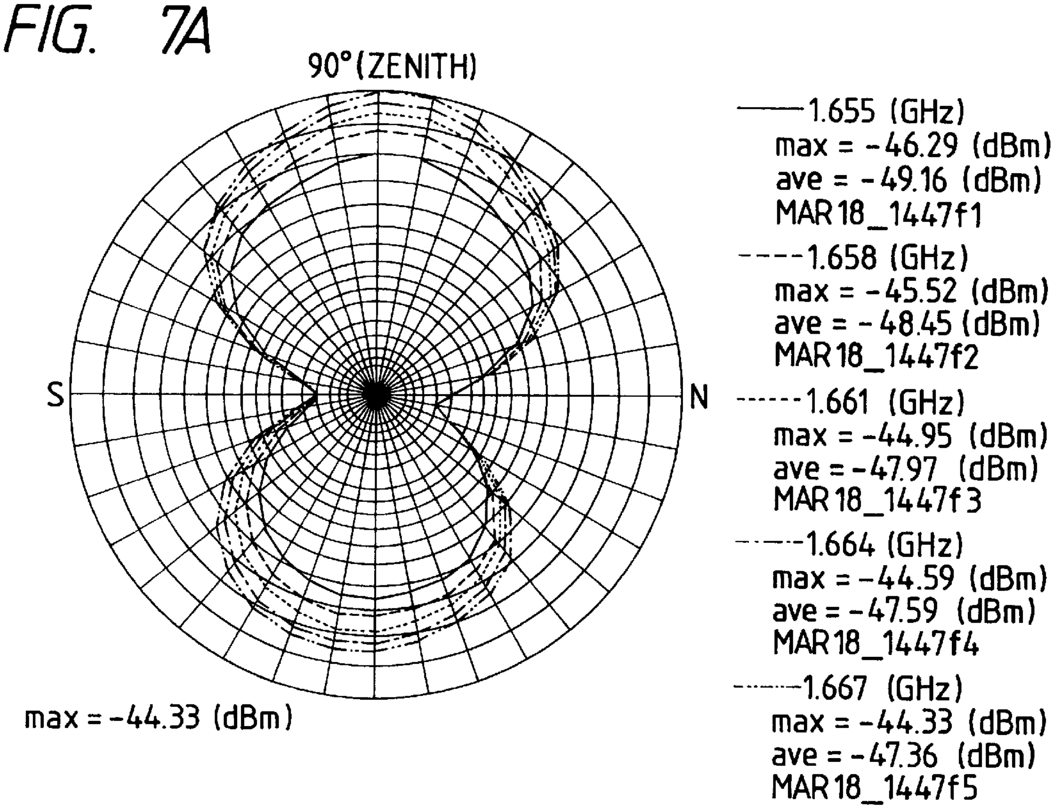
Figure 7B:
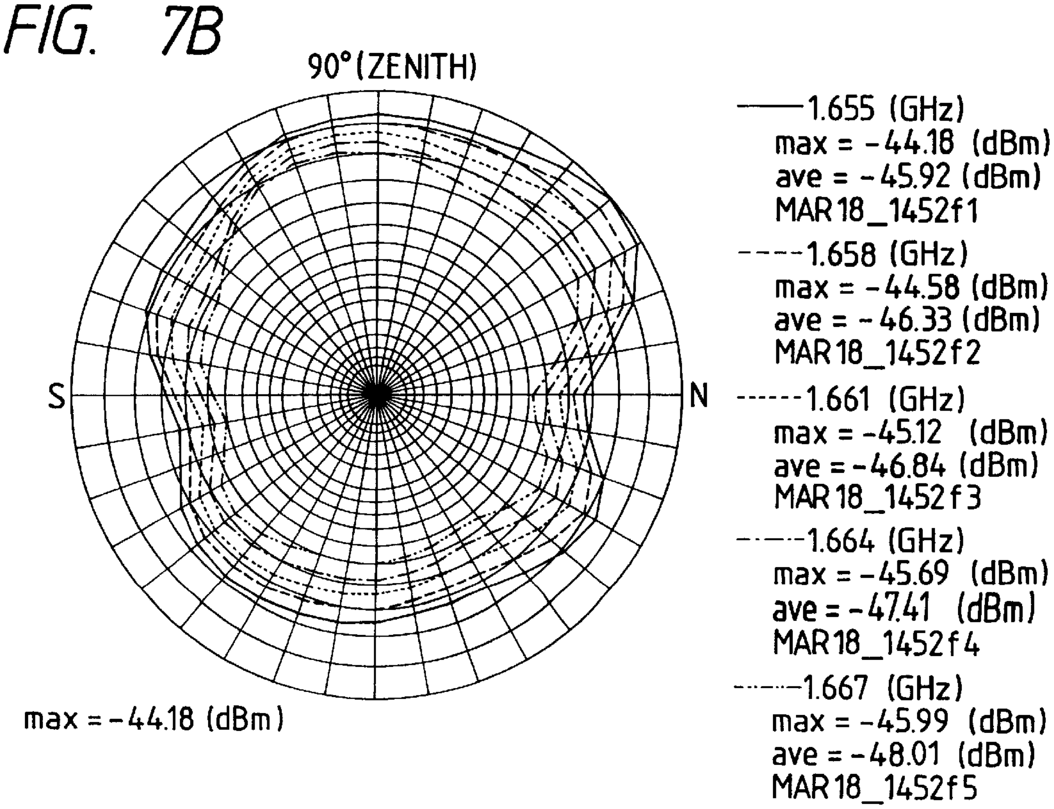

FIGS. 6A and 6B are views of radiation patterns from a comparative antenna for comparison with the present invention when the radiation patterns were measured respectively in two planes of polarization in the direction of the E–W section; and FIGS. 7A and 7B are views of radiation patterns from a comparative antenna for comparison with the present invention when the radiation patterns were measured respectively in two planes of polarization in the direction of the S–N section.

DETAILED DESCRIPTION OF PREFERRED EMBODIMENTS

Figure 1:
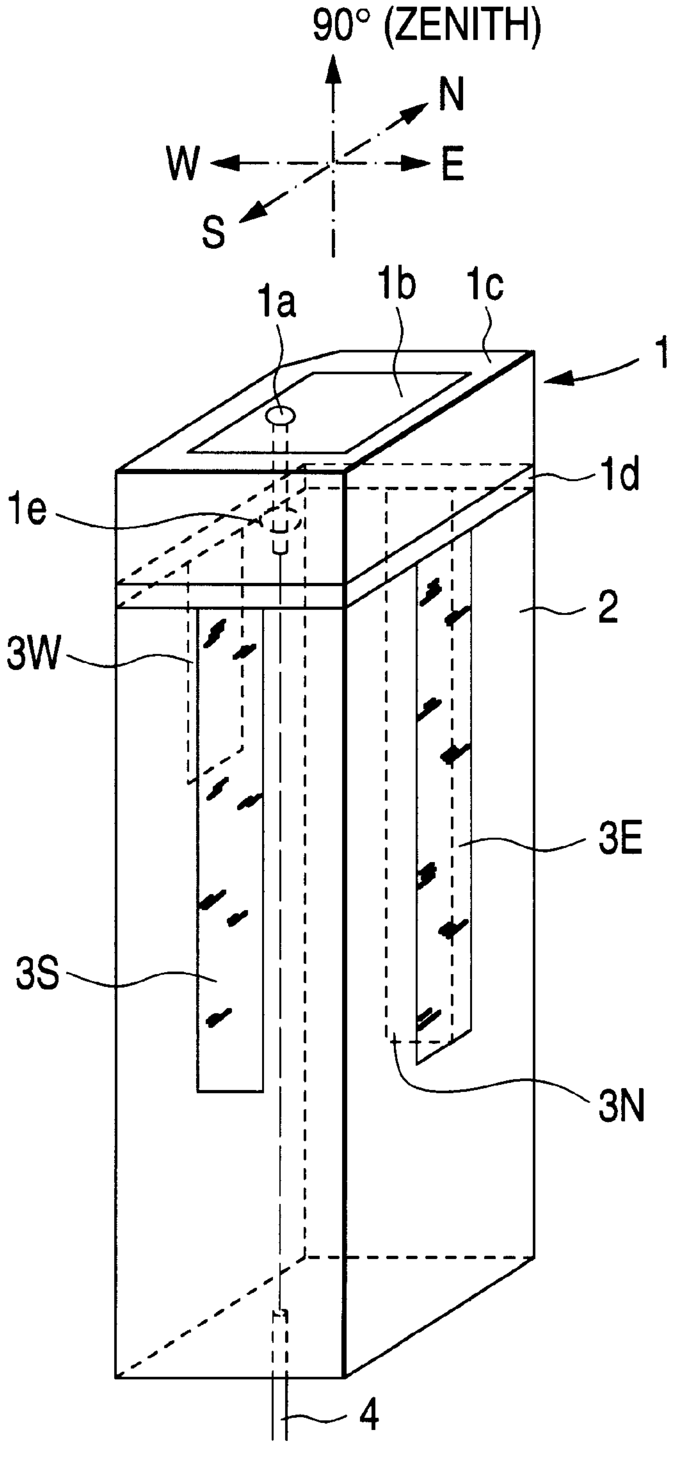
FIG. 1 is a perspective view of an antenna device in which linear radiating elements are electrically connected to a grounding conductor of a micro-strip flat antenna (MSA) according to an embodiment of the present invention.
Figure 2:
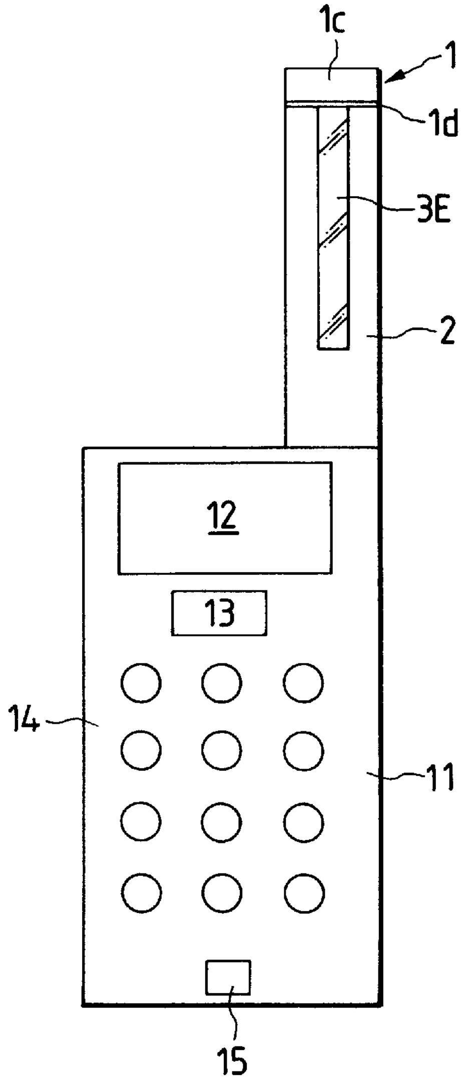
FIG. 2 is a front view of a satellite portable telephone to which the antenna device depicted in FIG. 1 is attached.

FIG. 1 shows an embodiment of the present invention. In FIG. 1, the reference numeral 1 designates a micro-strip flat antenna (MSA). Specifically, the reference numeral 1*a* designates a feeder pin of the MSA; 1*b*, a radiating element of the MSA; 1*c*, a dielectric substrate of the MSA; 1*d*, a grounding conductor of the MSA; 1*e*, a feeding pin of the MSA; 2, a pipe-like dielectric for supporting the MSA; and 3E, 3W, 3S and 3N, linear radiating elements electrically connected to the grounding conductor of the MSA. The reference numeral 4 designates a feeder line for feeding the MSA 1. FIG. 2 shows a state in which this antenna device is attached to a satellite portable telephone. In FIG. 2, the reference numeral 11 designates a satellite portable telephone body; 12, a display portion; 13, a speaker; 14, an operation portion; and 15, a microphone. The antenna device in FIG. 1 is designed so that the RF energy radiated at a low elevation angle to the 3E side is suppressed to be low. Accordingly, if the 3E side of the antenna device is directed to the front of the satellite portable telephone body 11 as shown in FIG. 2, radiation of relatively high-level RF energy to the head portion of a user is prevented at the time of talking. Furthermore, by means of the pipe-like dielectric 2, the MSA 1 and the linear radiating elements 3E, 3W, 3S and 3N are arranged in positions higher than the position of the satellite portable telephone body 11. Further, the speaker 13 is arranged under the display portion 12. Accordingly, the antenna device can be farther separated from the head portion of the user at the time of talking.

Figure 3A:
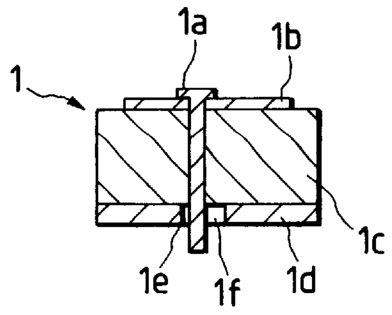
FIG. 3A is a sectional view of the MSA 1 taken along the line A—A in FIG. 3B.
Figure 3B:
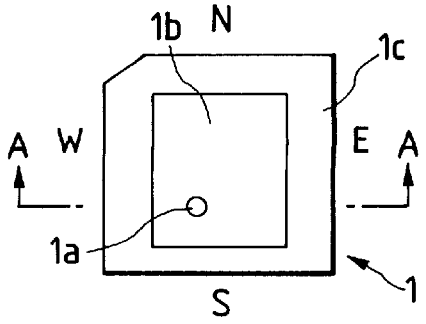
FIG. 3B is a view of the MSA 1 just from above.

Referring now to FIGS. 3A and 3B, the operation of a quadrilateral flat antenna for generating circularly polarized wave will be described. The radiating element 1*b*of the MSA 1 is a patch-like conductor element having a slight difference between longitudinal and lateral sizes. Accordingly, the long side of the radiating element 1*b* resonates with a relatively low frequency f1 and the short side of the radiating element 1*b* resonates with a relatively high frequency f2. The operation of the antenna as a circularly polarized antenna is obtained near a frequency f0 intermediate between f1 and f2, so that the antenna has a circularly polarized mode mainly in a vertical (zenithal) direction. Here, the feeder pin 1*a* is set aside from the center of the flat antenna for the purpose of impedance matching.

Figure 4A:
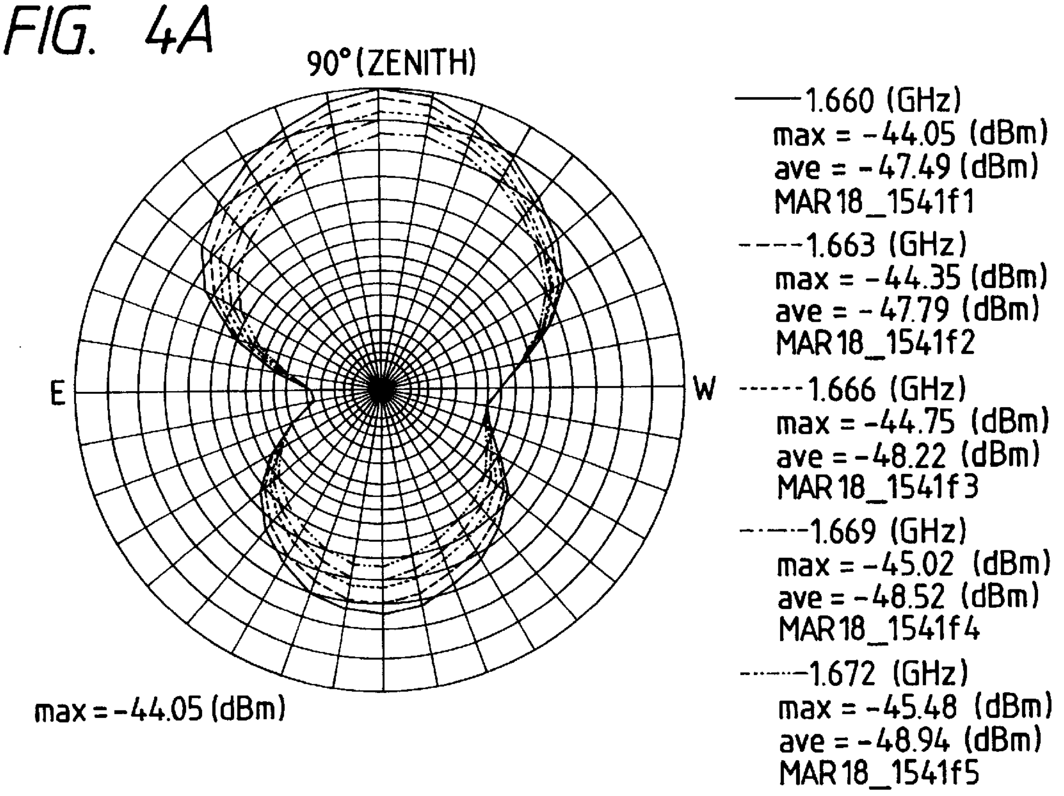
FIGS. 4A and 4B are views of radiation patterns from the antenna device according to an embodiment of the present invention as shown in FIG. 1 when the radiation patterns were measured respectively in two planes of polarization in the direction of the E–W section.
Figure 4B:
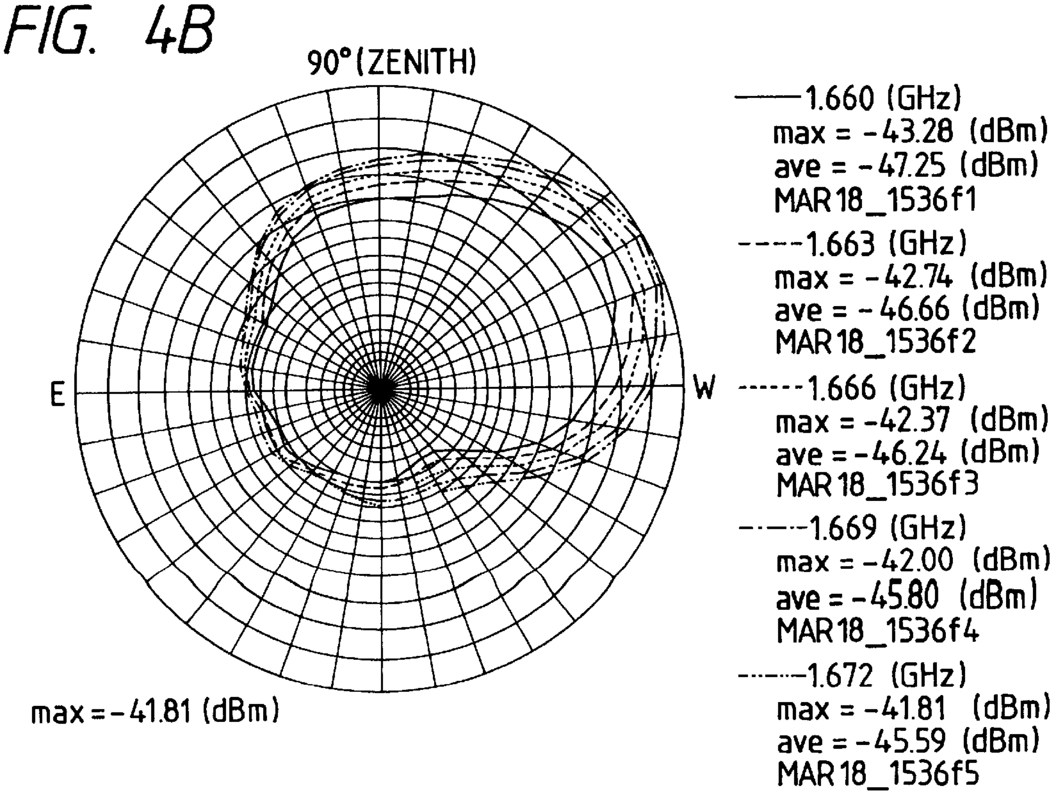
Figure 5A:
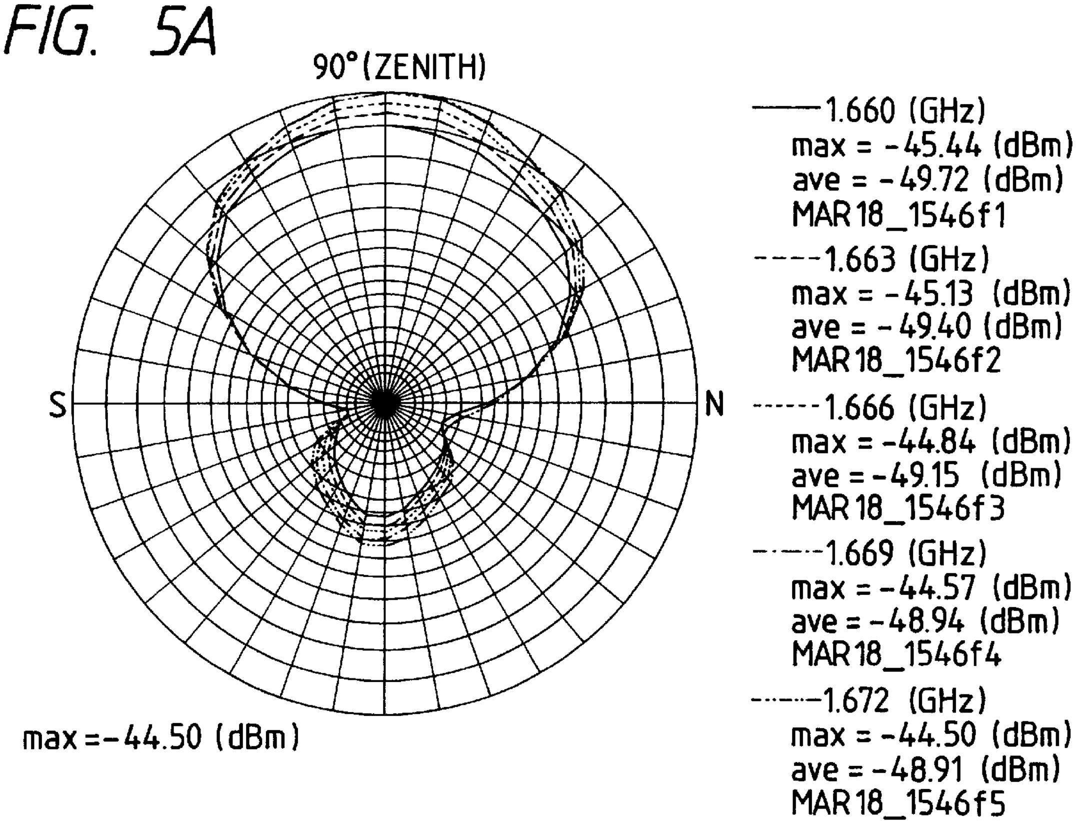
FIGS. 5A and 5B are views of radiation patterns from the antenna device according to an embodiment of the present invention as shown in FIG. 1 when the radiation patterns were measured respectively in two planes of polarization in the direction of the S–N section.
Figure 5B:
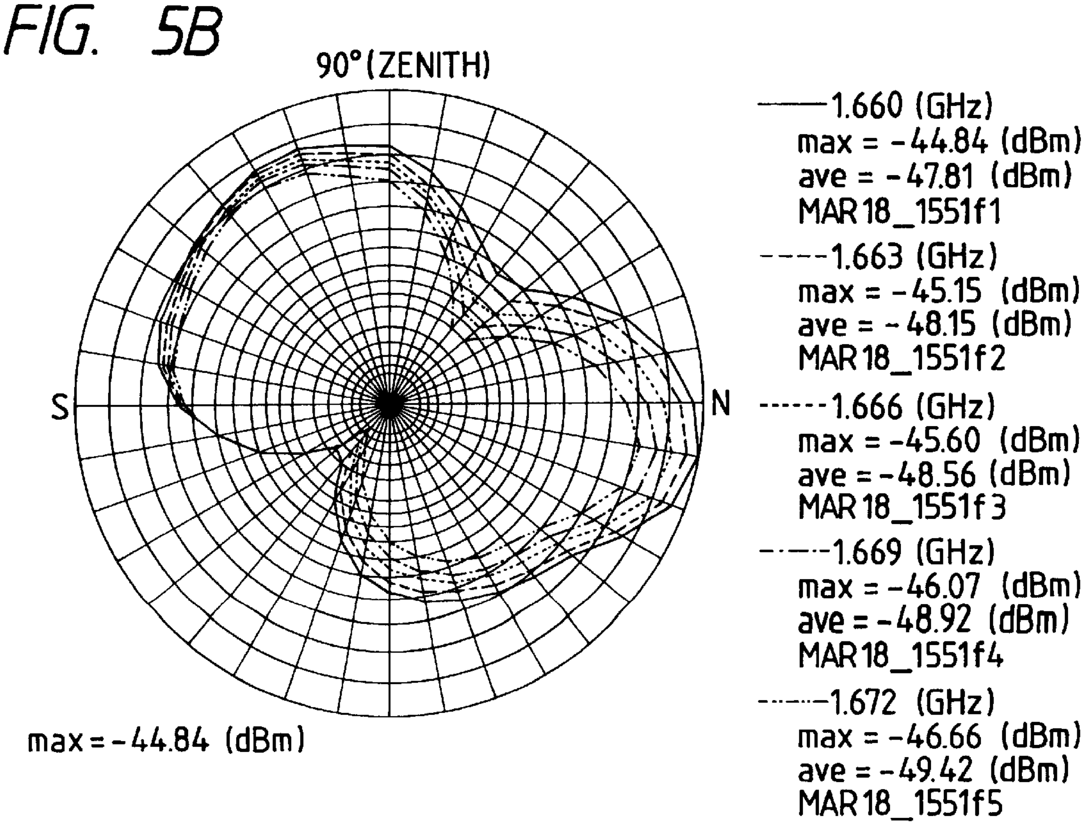

The antenna device according to the present invention in which the linear radiating elements 3E, 3W, 3S and 3N are electrically connected to the grounding conductor 1*d* of the MSA 1 will be described below. In an example of the present invention, the linear radiating elements 3E, 3W, 3S and 3N were formed of copper foil (width: 12.5 mm) correspondingly to the respective sides of the quadrilateral. The linear radiating elements 3E, 3W, 3S and 3N mainly conduct radiation to horizontal (low elevation angle) directions. The lengths of the linear radiating elements 3E, 3W, 3S and 3N were selected to be 9.0 cm, 4.0 cm, 8.5 cm and 10 cm, respectively. Views of measured radiation patterns of this antenna are shown in FIGS. 4A, 4B, 5A and 5B. FIGS. 4A and 4B show the cases where radiation patterns of two polarized wave components were measured in the direction of an E–W section of the antenna device. FIGS. 5A and 5B show the cases where radiation patterns of two polarized wave components were measured in the direction of an S–N section of the antenna device. Particularly, it is apparent from FIG. 4*b* that radiation to the E direction was suppressed and radiation to the W direction was strengthened. Also in FIG. 4A, radiation to the E direction was suppressed. Accordingly, if the antenna is mounted to a telephone so that the linear radiating element 3E is directed to the same front direction as the receiver portion 13 against which the user presses his/her ear at the time of talking as shown in FIG. 2, the RF energy radiated toward the user's head portion can be reduced by several dB. Further, because the radiation to the downward (reversed zenithal) direction of the antenna is suppressed, the suppression is useful for reduction of electric power consumed by the portable radio communication apparatus.

For comparison with the example of the present invention, a comparative antenna was provided so that the lengths of the linear radiating elements 3E, 3W, 3S and 3N were selected to be all 14 cm. Examples in which radiation patterns of the comparative antenna were measured are shown in FIGS. 6A, 6B, 7A and 7B. As shown in FIGS. 6B and 7B, none of radiations to the respective directions of E, W, S and N was suppressed, so that the comparative antenna could not achieve the object of the present invention. Further, radiation to the downward (reversed zenithal) direction of the comparative antenna became relatively intensive to be an hindrance against the reduction of electric power consumed by the portable radio communication apparatus.

Although the embodiment of the present invention has been described upon the case where four linear radiating elements 3E, 3W, 3S and 3N are electrically connected to the grounding conductor id directly, the number of linear radiating elements, the width, length and mount position of each linear radiating element, the method of coupling the linear radiating elements to the grounding conductor 1*d* (electrical coupling, capacitive coupling, or the like), etc. may be selected suitably so as to conform to the required directivity.

Although an embodiment of the invention using a quadrilateral MSA has been described for simplification, the invention may be configured by using a circular MSA. The shape of the MSA may be selected desirably.

Although a satellite portable telephone has been described as a specific embodiment of the invention, it is a matter of course that the invention may be applied to a portable telephone for communicating with a ground base station.

As described above, according to the present invention, electromagnetic wave can be prevented from giving a user a risk of injuring his/her health when a portable telephone is used. Furthermore, because radiation to the downward (reversed zenithal) direction of the antenna is suppressed, the invention is useful for reduction of electric power consumed by the portable radio communication apparatus.

What is claimed is:

1. A portable radio communication apparatus comprising:

a case body; and an antenna device having a surface on which radiation of an output of said antenna device is suppressed in at least one direction, the antenna device including a plurality of directionally related linear radiating elements, at least one of which is altered relative to the others to achieve the suppression in at least one direction;

wherein said antenna device is attached to said case body so that the radiation-output-suppressed surface of said antenna device is arranged to face an user side at the time of talking.

2. A portable radio communication apparatus according to claim 1, wherein the downward radiation output of said antenna device is suppressed.

3. A portable radio communication apparatus comprising:

a case; and an antenna device having a flat antenna directed in a vertical direction, and a plurality of linear radiating elements connected to a grounding conductor of said flat antenna and arranged downwardly;

wherein at least one of plural design factors including the number, width, length, and mount position, of said linear radiating elements is changed so that radiation of an output of said antenna device on a surface thereof is suppressed in at least one of horizontal directions, and wherein said antenna device is attached to said case so that the radiation-output-suppressed surface is arranged to face a user side at the time of talking.

4. A portable radio communication apparatus according to claim 3, wherein said flat antenna is a circularly polarized antenna having a circularly polarized mode mainly in a vertical direction.

5. A portable radio communication apparatus according to claim 3, wherein the downward radiation output of said antenna device is suppressed.

* * * * *